Aug. 10, 1954 D. L. BLANEY 2,686,229
MAGNETIC RECORD COPYING
Filed April 16, 1949

INVENTOR.
DOROTHY L. BLANEY
BY
Carl R. Gorham
ATTORNEY

Patented Aug. 10, 1954 2,686,229

UNITED STATES PATENT OFFICE 2,686,229

MAGNETIC RECORD COPYING

Dorothy L. Blaney, Los Angeles, Calif., assignor to Radio Corporation of America, a corporation of Delaware Application April 16, 1949, Serial No. 87,923

5 Claims. (Cl. 179—100.2)

This invention relates to magnetic sound record production, and particularly to the copying or printing of magnetic records to provide duplicates of the original sound track.

In the recording and reproduction of photographic sound records for phonographs or motion picture use, duplicate records of the sound track are provided by photographically printing a positive from a negative, either by contact or by optical methods. In the production of duplicate magnetic records, however, it is necessary either to rerecord the original record to a new record, or to accomplish the printing in some other manner.

The present invention is directed to a method of and system for making duplicate magnetic records from the original magnetic sound track by the contact method, the transfer of magnetism in the original sound track to the new record medium being aided by the application of high frequency magnetic variations to the material similarly to the application of the high frequency magnetic variations or bias applied during the original recording. That is, adjacent to or actually at the point of contact between the original magnetic sound record medium, which may be a film or tape, and the magnetic sound record medium to which the record is to be transferred, and which may also be a film or tape, a high frequency magnetic variation is produced in the magnetic particles. This permits an efficient and sufficient transfer of magnetism to the transfer record medium to provide a satisfactory, new magnetic record.

Although it is realized that printing may be produced without additional bias, it is desirable that this bias be applied to increase the efficiency and fidelity of the transfer. It was found that, although there was some loss of level of the original record at the first transfer, additional transfers did not reduce the level of the original to any appreciable extent. Thus, a considerable number of transfers can be made from the original record in accordance with the invention described hereinafter.

The principal object of the invention, therefore, is to facilitate the production of duplicate magnetic records from an original magnetic record.

Another object of the invention is to provide an improved method of and means for rapidly making duplicates of magnetic sound records.

A further object of the invention is to increase the efficiency of transfer of a magnetic record to a second magnetic record medium advanced in contact therewith.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Figure 1:
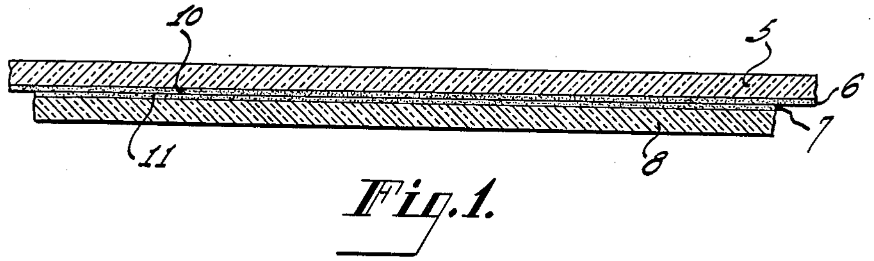
Fig. 1 is an enlarged, cross-sectional view of two magnetic mediums shown in contact with one another.

Referring now to the drawings, in which the same numerals identify like elements, Fig. 1 shows a magnetic record medium, such as a film or tape, having a base 5 and a layer or coating 6 of finely divided magnetic oxide particles of any standard well-known type. In contact with the layer 6, is a similar layer 7 of a second magnetic record medium, such as a film or tape, and having a base 8. To indicate the recorded sound track or variations in magnetism in certain particles along the length of the record medium 5—6, certain areas in the layer 6 are stippled, as shown at 10. When the two mediums are in contact, similar magnetic areas 11 are produced in the magnetic record medium 7—8. Thus, Fig. 1 illustrates that a transfer of magnetism will occur simply by placing the original record 5—6 in contact with a similar record medium 7—8.

It is well-known that, in the recording of magnetic records, a high frequency bias, which generally is a high frequency oscillation in the neighborhood of eighty to one hundred kilocycles, is applied to the magnetic particles at the time the audio is impressed thereon. By thus agitating the particles, a higher efficiency of impression of the audio on the magnetic particles is obtained, as well as a higher fidelity, caused by freedom from noise and distortion. Thus, to simulate this original form of recording during the printing or duplicating operation, a similar high frequency bias is applied to the magnetic record medium to which the record is to be transferred, the amplitude of this bias, however, not being sufficient to erase the original record.

Figure 2:
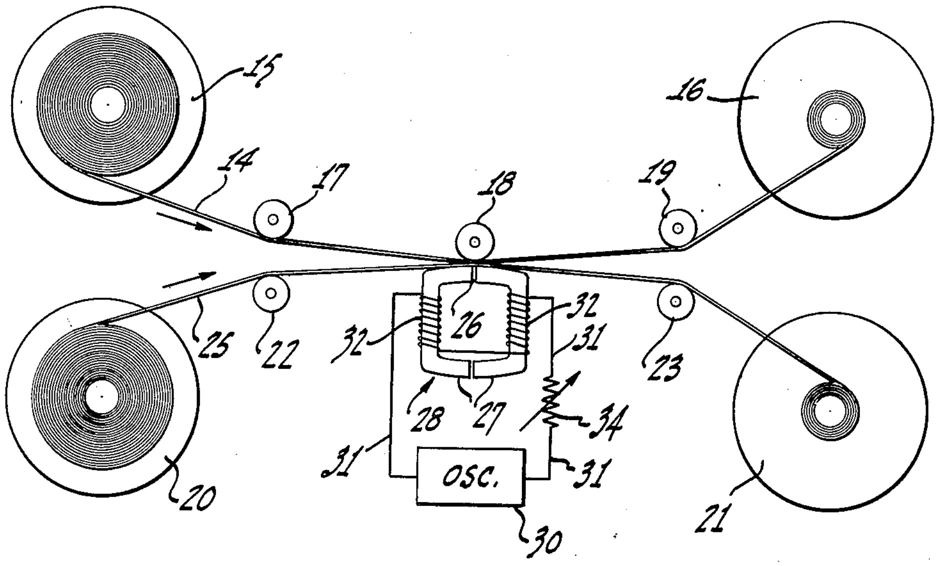
Fig. 2 is a diagrammatic view of a system of transferring a magnetic record to a second magnetic record medium.

Referring now to Fig. 2, the record medium 14, having the original record thereon, is shown being advanced from a reel 15 to a reel 16, under rollers 17, 18, and 19, the record being driven in any well-known manner. Being advanced from a reel 20 to a reel 21 over rollers 22 and 23 and under roller 18, is a magnetic record medium 25, to which the record on medium 14 is to be transferred. It will be noted that roller 18 maintains the two mediums 14 and 25 in contact immediately above a gap 26 in cores 27 of a magnetic head 28. An oscillator 30, over conductors 31 and windings 32, applies to the particles in the coating on medium 25, variations in magnetism or field force of substantially constant amplitude across the gap 26 in accordance with the frequency of the output of oscillator 30, which may be between eighty and one hundred kilocycles. The amplitude of the magnetic variations is under the control of a rheostat 34.

Thus, to transfer the record from tape 14 to tape 25, the two tapes are advanced from reels 15 and 20 to reels 16 and 21, respectively, with their coatings in contact, and a bias applied through the base of the tape 25, so as to agitate the particles and permit an efficient impression of the record on medium 14 to medium 25.

Figure 3:
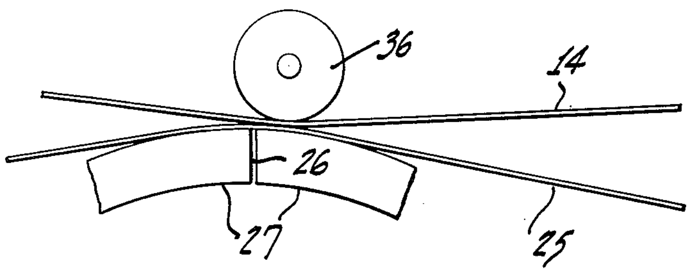
Fig. 3 is a detailed view of a modification of the application of the bias of the system of Fig. 2.

Referring now to Fig. 3, the upper ends of the cores 27, forming the gap 26, are shown along with mediums 14 and 25. In this instance, a roller 36, similar to roller 18, which holds the mediums in contact, is shifted from directly above the gap 26 slightly to the right thereof. Thus, the films are brought into contact slightly to the right of the gap 26. The tape 14 is thus separated from the tape 25 directly above the gap where the field is the strongest. In this manner, a higher amplitude of bias energy may be applied to the medium 25 without danger of erasing the magnetism of the record in the medium 14, while, at the same time, providing the necessary excitation of the particles in medium 25 to permit an efficient printing of a record with high fidelity.

I claim:

1. A magnetic printing and copying system for magnetic sound records, comprising a magnetic sound record medium having a sound track thereon, a magnetizable record medium, means for advancing said magnetic record medium having a sound track thereon in contact with said record medium on which said sound track is to be transferred, said contact being substantially along a line transversely of said mediums, and means for magnetically exciting the particles in the magnetizable record medium to which the sound is to be transferred substantially at the line of contact of the two record mediums.

2. A magnetic printing and copying system in accordance with claim 1, in which said last mentioned means comprises a magnetic head having a gap therein, said advancing means advancing said mediums over said gap and in contact therewith, and an electrical oscillator connected to said head for creating fluctuations in magnetism across said gap.

3. A system for producing duplicates of a magnetic sound track, comprising a magnetic sound record medium having a sound track recorded thereon, a magnetizable sound record medium on which said sound record is to be printed, means for advancing said record mediums, means for maintaining contact with said record mediums along a line across said mediums, and means for applying magnetic variations of a frequency above the highest frequency on said track to the magnetic particles in the magnetizable record medium to which said magnetic record is to be printed substantially at said line of contact.

4. A system for producing duplicates of a magnetic sound track in accordance with claim 3, in which said last mentioned means comprises an electrical oscillator and a magnetic head having a core with a gap therein connected to said oscillator, said gap being substantially at the line of contact of said two records with said head.

5. A system for producing duplicates of a magnetic sound track comprising a magnetic sound record having a sound track thereon, a magnetizable record medium, means for advancing said magnetic record medium having a sound track thereon substantially in line contact with said magnetizable record medium on which said sound track is to be transferred, and means for magnetically exciting the particles in the magnetizable record medium to which the sound is to be transferred substantially at the line of contact of the two record mediums.

References Cited in the file of this patent

UNITED STATES PATENTS

| Number | Name | Date |
|---|---|---|
| 2,327,956 | Begun | Aug. 24, 1943 |

FOREIGN PATENTS

| Number | Country | Date |
|---|---|---|
| 880,559 | France | Mar. 30, 1943 |

OTHER REFERENCES

S. M. P. E. Journal, January 1949, pp. 77–88.